Nov. 12, 1963 E. J. CRUM Re. 25,477

COILING STRAND MATERIAL

Original Filed Oct. 3, 1957 4 Sheets-Sheet 1

INVENTOR.
E. J. CRUM
BY Albert J. Kramer
ATTORNEY

COILING STRAND MATERIAL

Original Filed Oct. 3, 1957 4 Sheets-Sheet 2

INVENTOR.
E. J. CRUM
BY
Albert J. Kramer
ATTORNEY

Nov. 12, 1963 E. J. CRUM Re. 25,477

COILING STRAND MATERIAL

Original Filed Oct. 3, 1957 4 Sheets-Sheet 3

INVENTOR.
E. J. CRUM
BY Albert J. Kramer
ATTORNEY

INVENTOR.
E. J. CRUM
BY
Albert J. Kramer
ATTORNEY

United States Patent Office

Re. 25,477
Reissued Nov. 12, 1963

25,477
COILING STRAND MATERIAL

Eben Jefferson Crum, % Wirecrafters, Inc.,
P.O. Box 6763, Baltimore, Md.

Orignal No. 2,957,646, dated Oct. 25, 1960, Ser. No. 687,923, Oct. 3, 1957. Application for reissue June 13, 1962, Ser. No. 202,945
6 Claims. (Cl. 242—174)

Matter enclosed in heavy brackets [ ] appears in the original patent but forms no part of this reissue specification; matter printed in italics indicates the additions made by reissue.

This is a continuation-in-part of my copending application Serial No. 591,230,, filed June 13, 1956, *now Patent No. 2,954,180, issued September 27, 1960.*

This invention relates to the coiling of [strand or elongated materials, such as wire, rope, hose, cable, and others.] *metallic wire. Wire has castable properties that permit it to assume modified shapes on being stressed, such as by bending or twisting, to a degree beyond its elastic limit or yield point without breaking.*

In the arrangement of such materials in coil form, a conventional practice comprises providing the coils concentric of each other. Large coils may be thus provided or groups of smaller coils connected together.

Providing coils in this concentric manner frequently results in the slippage of one or more of the coils out of place. Ideally, each coil of a group should lie on top of its preceding coil. However, it is practically impossible to achieve this ideal condition with concentric coils unless they are supported against lateral shifting by a spool or some other kind of holding device. The coils of a completely unsupported group of concentric coils tend to shift laterally, whereupon they become displaced vertically relative to each other. This becomes a difficult situation in the subsequent uncoiling operation when it is desired to use the material. Because of this lateral shifting and displacement, the uncoiling is likely to be met with frequent tangles.

One of the objects of the present invention is to provide a method of arranging coils of [strand material] *wire* which eliminates the lateral shifting of the coils and the relative displacement thereof with respect to each other.

Another object of the invention is the provision of a method of arranging coils of [strand material] *wire* so that the uncoiling thereof does not tend to produce tangles.

A further object of the invention is the provision of a novel arrangement of coiled [strand material] *wire* which can be uncoiled without tangles.

These and still further objects, advantages and features of this invention will appear more fully from the following description considered together with the accompanying drawing.

Figure 3:
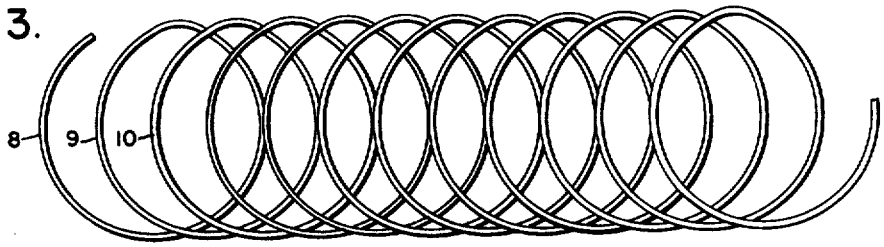
FIG. 3 is a plan view of a length of wire coiled and arranged in accordance with this invention to illustrate the principle thereof.
Figure 4:
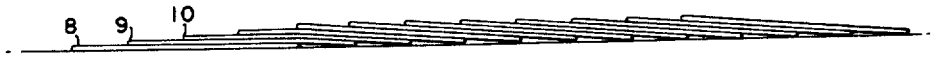
FIG. 4 is a side elevational view of the wire as arranged in FIG. 3.

The method of this invention comprises essentially forming consecutive coils of a [strand material] *wire* and arranging them on a horizontal surface so that each coil is displaced eccentrically from its preceding coil by an amount which is at least sufficient to prevent slippage of the coils relative to each other. This is clearly shown in FIG. 3 where the second turn 9 is displaced to the right from the first turn 8, the third turn 10 is displaced from the second turn 9 an equal distance, and so forth.

Figures 1, 2:
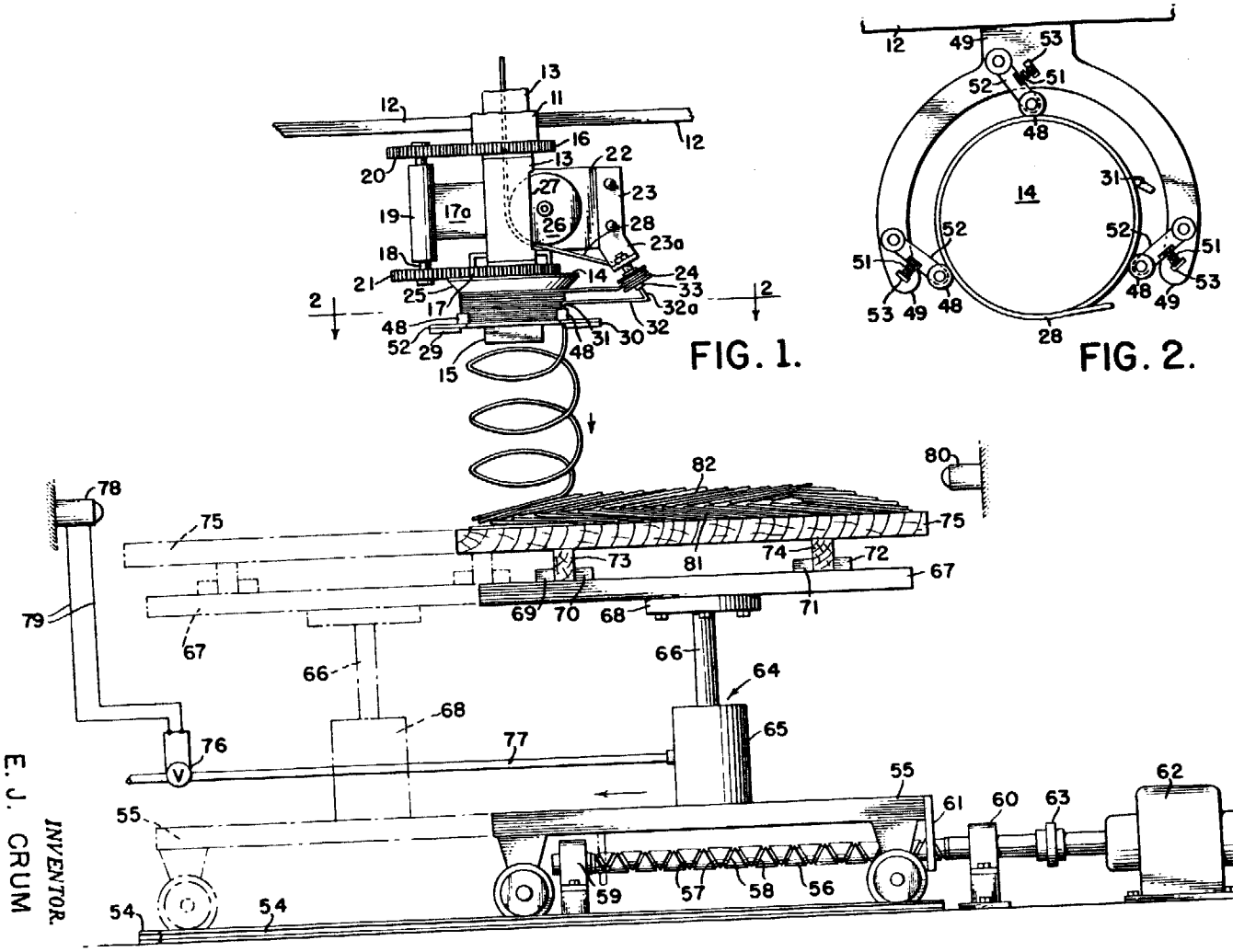
FIG. 1 is a side elevational view of a device being used to provide an arrangement of coiled [strand material] *wire* in accordance with this invention.
FIG. 2 is a plan sectional view along the line 2—2 of FIG. 1.

In FIG. 1 apparatus for automatically carrying out this method is shown, and it comprises as one part a coiler of the type described in my U.S. Patent No. 2,743,066 having a hollow stationary casing 11 supported by any suitable means, such as frame members 12. Within said casing there is rotatably mounted a hollow vertical shaft 13, the lower end of which is rotatably connected to a circular drum or block 14 by means of a collar bearing 15 and whereby the drum is carried by the said shaft. The shaft may be driven by any suitable exterior means (not shown), such means being well known in the art and need not be described herein.

A horizontal upper ring gear 16 is secured to the bottom of the casing 11 and a similar lower gear 17 is secured to the top of the drum 14, both gears being concentric with the shaft 13. Secured to and extending laterally from the shaft 13 is an arm 17a which carries a vertical rotatable shaft 18 in a tubular bearing 19. The ends of the shaft 18 are secured to gears 20 and 21 for rotation therewith, which gears are in mesh with the gears 16 and 17, respectively, as shown. By these means, the gear 17, and hence the block 14, is held in the same stationary position as the casing 11, irrespective of the rotation of the shaft 13, since the gears 16 and 17 cannot move relative to each other so long as they are connected together through the gears 20 and 21 and shaft 18.

Another arm 22 is also secured to and extends laterally from the shaft 13. The outer end of the arm 22 carries a bracket 23, the lower end 23a of which is disposed at an outward angle and which rotatably carries a guide sheave 24. The upper end of the drum 14 has an annular upwardly extending flare 25 and the lower end of the sheave is on a horizontal line just below the top of the drum. The arm 22 rotatably carries another guide sheave 26 which extends part way through a vertical slot 27 of the shaft 13. By these means, the rope or wire 28 to be coiled is led downward through the hollow shaft 13 over the sheave 26, out through the slot 27, over the sheave 24, to the drum 14, whereby rotation of the shaft 13 will cause the rope or wire to be wound about the periphery of the stationary drum 14. Each turn or convolution added to the drum causes the preceding turns to slide downward a corresponding distance. However, the bottom of the drum is provided with a flange 29 on top of which a foot member 30 of a peeling device revolves. The foot member comprises the bottom of a vertical leg 31, connected to an outwardly extending arm 32 carried by the bracket 23. Although any suitable means may be employed for supporting the arm 32, in the embodiment illustrated, its outer end 32a is bent in line with the axis of the sheave 24 and is secured to the shaft 33 upon which the sheave is rotatably carried. By these means, the coil around the drum is continuously peeled from the bottom as the bracket 23 revolves, the lower convolution of the coil being on the outside of the leg 31. Accordingly, the revolving of the bracket 23 accomplishes two purposes, namely, (1) winding of the rope or wire in the form of a coil about the top of the drum and (2) unwinding or peeling of the coil from the bottom.

As the coil is peeled from the bottom, it drops by gravity and falls as indicated hereinafter.

In order to maintain sufficient friction of the wire or rope against the face of the drum 14, and to avoid strands from dropping too rapidly or permaturely without benefit of the action of the peeler, a group of vertical rollers 48 is carried on spring loaded arms 52 which are pivoted to a stationary shelf 49. The shelf 49 is carried on brackets 50. The springs 51 are mounted between the arms 52 and abutments 53 on the shelf 49 so as to urge the rollers 48 in gentle contact with the wire or rope on the face of the drum. Consequently, as the leg 31 moves about the drum, it passes between the drum and the rollers. The latter moves outwardly against the action of the springs 51 each time the leg 31 passes and is returned immediately by the springs.

Beneath the coiler is a track composed of a pair of parallel rails 54, 54 on which a wheeled cart 55 travels back and forth. This motion may be imparted to the cart by any suitable means, one suggested means being illustrated in FIG. 1 and which comprises a horizontal shaft 56 having reverse threads 57 and 58. This shaft is mounted for rotation in bearings 59 and 60 and is threadedly engaged with a yoke 61 secured to the cart 55, as shown. The shaft is driven by a motor 62 through a suitable coupling 63.

A hydraulic jack 64 has a stationary base 65 secured to the cart 55 and a vertically movable ram 66 associated therewith. A platform 67 is secured to and carried by a flange 68 at the top of the ram 66.

The platform 67 is provided with two pairs of parallel cleats 69, 70 and 71, 72 for removably straddling the legs 73 and 74, respectively, of a skid or pallet 75.

The vertical movement of the ram 66 is controlled by an electrically operated hydraulic valve 76 which is hydraulically connected to the jack 64 by a cable 77 and electrically connected to a photoelectric cell 78 by wires 79.

The photoelectric cell 78 is positioned at one end of the tracks facing the other end and a light beam source 80 is stationed at the said other end, the light beam being directed at the photoelectric cell at a level just above the place where it is desired to deposit the coils of material on the pallet.

When the beam of light from the light source 80 striking the photoelectric cell 78 is broken, the valve 76 is placed in operation to lower the ram 66 until the beam is again restored to the photoelectric cell.

In actual operation, the electric motor 62 is started which, by rotating the shaft 56 relative to the yoke 61, has the effect of causing the cart 55 to move back and forth on the tracks 54, 54. With the beam of light from the light source 80 shining on the photoelectric cell 78, the pallet or skid 75 is maintained at a constant elevation.

The coiling device is then started which has the effect of dropping on the pallet 75 a continuous series of coils, each coil being displaced relative to its preceding turn, thereby forming a first horizontal layer 81 of coiled wire on the pallet, as shown. Upon the automatic reversal of the motion of the cart 55 on the tracks 54, 54 a second layer 82 of coiled wire is formed on the first layer 81. This continues until the desired number of layers have been formed. As the layers build up on the pallet, they intercept the light beam from the source 80, thereby actuating the valve 76 to lower the pallet until the beam is again restored to the photoelectric cell. Thus, the layers are each placed on the pallet at a substantially constant elevation which provides uniformity among the layers and also permits placing the coiler closer to the pallet to avoid undue spreading of the coils.

The layers as they are thus formed on the pallet are distinguishable from coils provided by other means in the herringbone side pattern developed. See FIG. 1.

After the desired number of layers has been formed, a fork lift truck (not shown) or other means may be used to discharge the loaded pallet, whereupon another empty pallet is substituted, the height of the ram reset, and the procedure repeated.

When it is desired to uncoil the strand material from storage on the pallet for use, the loose end of the wire on the uppermost layer is pulled. The likelihood of one loop getting tangled in another is remote, because of the definite offset position which each turn is made to assume with respect to its adjacent turns, thereby avoiding lateral slippage and the entanglements caused thereby.

Figure 5:
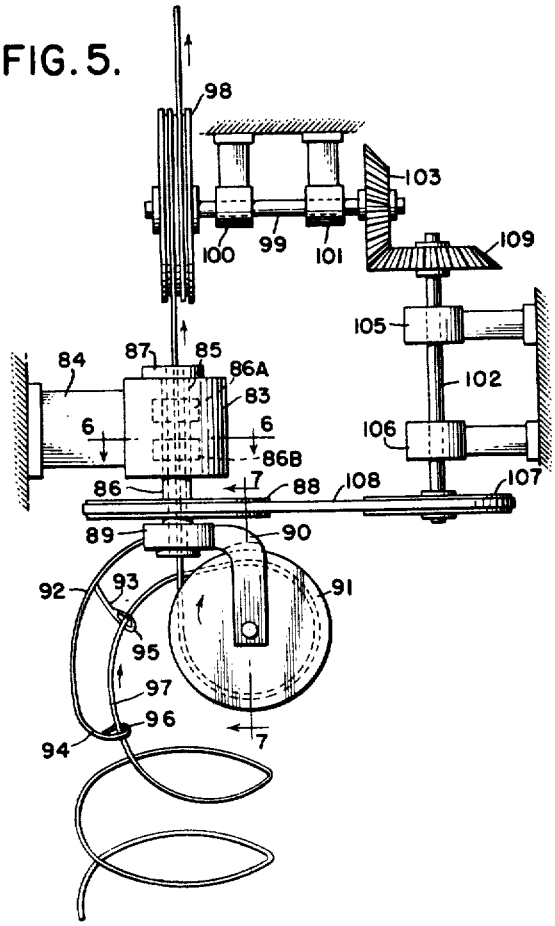
FIG. 5 is a schematic plan view of an uncoiling device.
Figure 6:
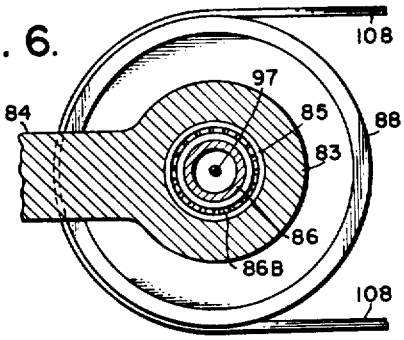
FIG. 6 is an enlarged section along the line 6—6 of FIG. 5.
Figure 7:
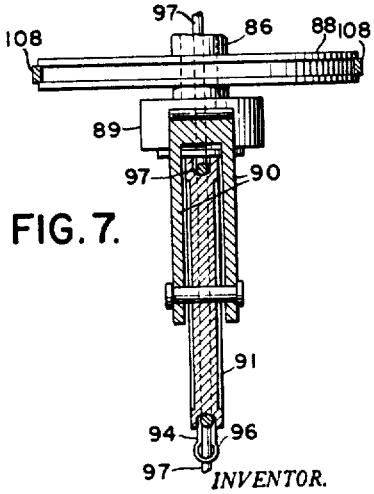
FIG. 7 is an enlarged section along the line 7—7 of FIG. 5.

A device for use in uncoiling coiled wire is shown schematically in FIGS. 5, 6 and 7, and it comprises means for twisting the wire about the longitudinal axis for each coil that is unwound in a direction and in an amount to compensate for the twist that is normally imparted to a coil about its longitudinal axis when it is pulled out straight. It comprises a housing 83 carried on a fixed bracket 84 having a vertical aperture 85 therethrough for rotatably carrying a hollow vertical shaft 86 on bearings 86A and 86B. The upper end of the shaft 86 has an outward flange 87 which rests on the top of the housing 83. The shaft 86 extends below the bottom of the housing 83 and is secured to a pulley wheel 88 for rotation therewith. Below the pulley wheel 88 a collar 89 is connected for rotation to the shaft and carries on one side, eccentrically of the shaft 86, a bifurcated bracket 90 on which is rotatably mounted a grooved wheel 91 tangent to a vertical line passing through the axis of the hollow shaft 86. On the other side of the collar 89 is an outwardly and downwardly curved arm 92 having fingers 93 and 94 which contain loops 95 and 96, respectively. The coiled wire 97 or other elongated material is passed through these loops, then over and around the grooved wheel 91 and hence upward through the hollow part of the shaft 86. It is then passed around a drive wheel 98 several times and hence discharged as needed. The wheel 98 is mounted for rotation on a horizontal shaft 99, the latter being rotatably mounted in fixed or stationary bearings 100 and 101. The shaft 99 is geared to a vertical shaft 102 by means of bevel gears 103 and 109 or any other suitable means.

The vertical shaft 102 is rotatably mounted in fixed bearings 105 and 106 and carries a pulley wheel 107 that is geared to the pulley wheel 88 by a belt 108.

When the wire 97 is pulled upward above the wheel 98, it causes rotation of this wheel and also, through the gears 103, 109, pulley wheels 107, 88, and belt 108, rotation of the hollow shaft 86. This causes the arm 92 and grooved wheel 91 to turn and hence untwist the wire before it advances upwardly through the hollow shaft 86.

The pulleys 88 and 107 are preferably of the variable V-belt type in order to vary the relative speeds thereof. The proper operation of the device requires the diameter of the coils and that of the wheel 98 to be the same. The variability between the pulleys 88 and 107 permit compensating for any differences which may develop between the size of the coils and the wheel 98 while the device is in operation.

Figure 8:
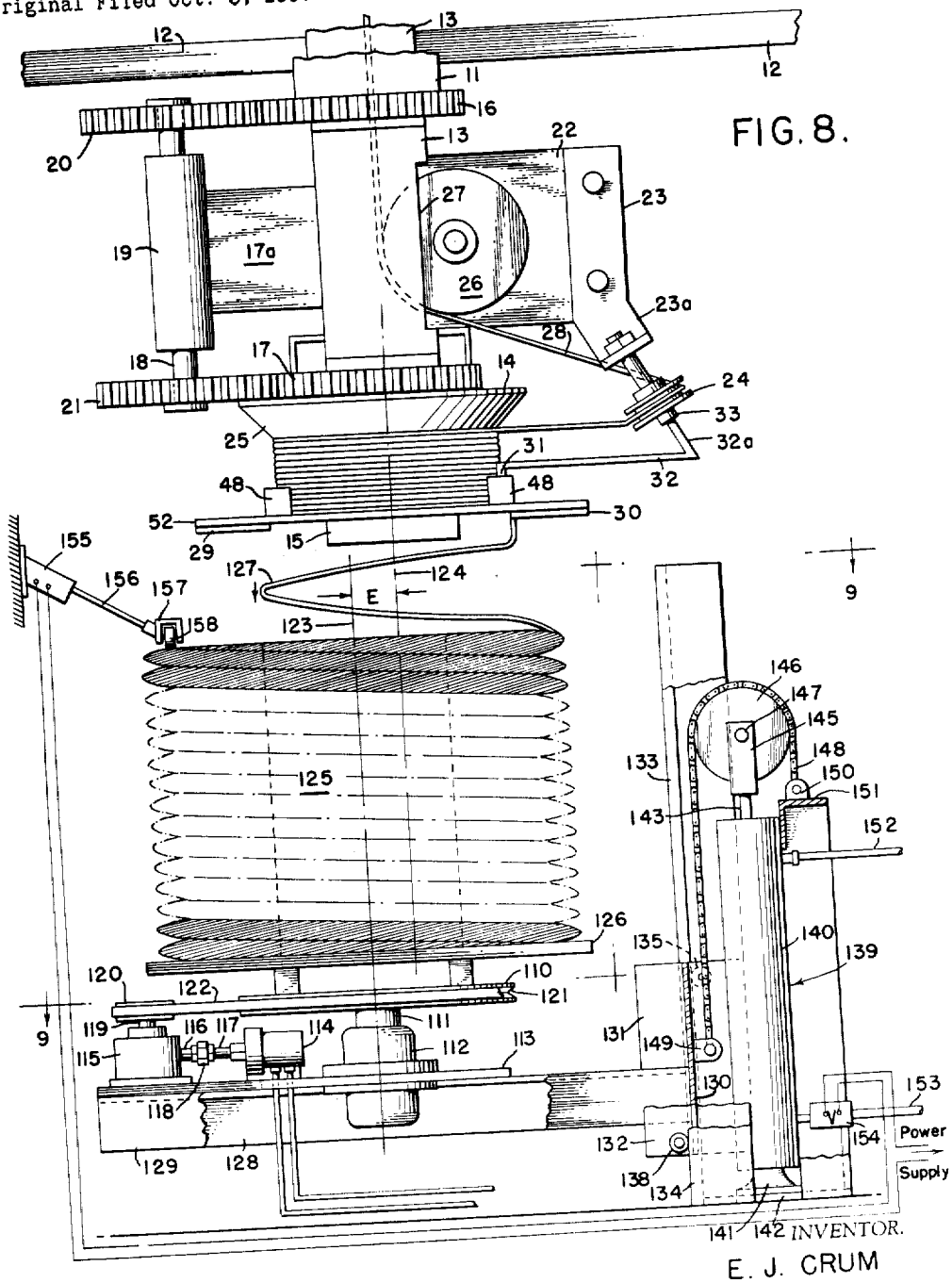
FIG. 8 is a view similar to FIG. 1 illustrating a modified form of the invention, partly broken away, for coiling a circular package of wire [or other strand material].
Figure 9:
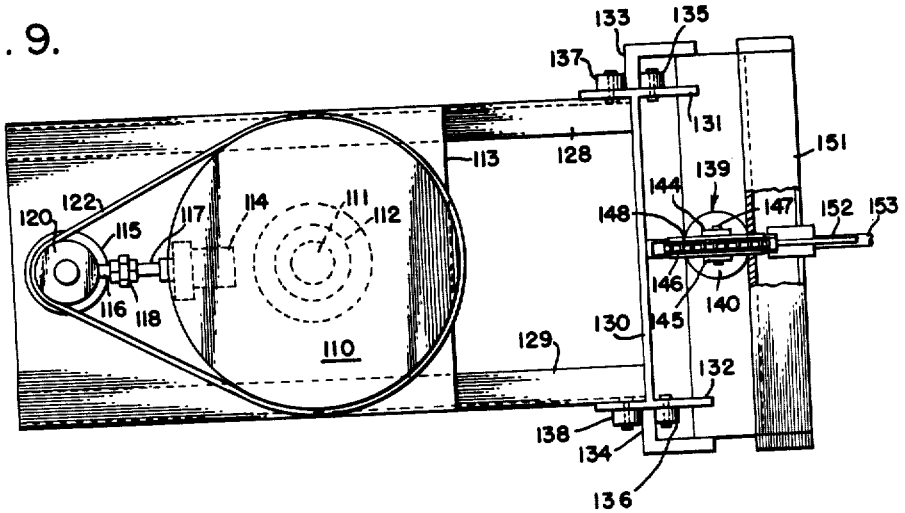
FIG. 9 is a section along the line 9—9 of FIG. 8.

In the embodiment of FIGS. 8 and 9, there is substituted for the lower reciprocating platform structure a turntable 110 mounted on a shaft 111 which, in turn, is supported by a thrust bearing 112 on a horizontal ledge or shelf 113. The turntable 110 is driven by a variable speed motor 114, preferably of the hydraulic type, through a speed reducer 115, the input shaft 116 of which is coupled to the take-off shaft 117 of the motor by a suitable shaft coupling 118.

The take-off shaft 119 of the reducer 115 is provided with a pulley 120 and it is positioned in the plane of the turntable 110. The periphery of the turntable is provided with an annular groove 121 and is connected to the pulley 120 by an endless belt 122. The motor 114 and reducer 115 are both secured to the ledge 113.

The vertical axis 123 of the turntable 110 is eccentrically disposed relative to the axis 124 of the drum 14, as shown, the inner and outer diameter of the resulting bundle 125 being each a function of this eccentricity, E.

The turntable 110 is adapted to support a pallet 126 upon which the bundle 125 of wire, rope or other strand material is to be laid up as the loops 127 fall from the block 14.

The ledge 113 is carried on parallel cantilever arms 128 and 129 secured to a cross beam 130. This cross beam has secured to it at either end flanges or right angle plates 131 and 132. These plates are disposed adjacent vertical columns 133 and 134 which form part of the frame structure of the machine. Each of the plates 131 and 132, carry an upper roller 135, 136 and a lower roller 137, 138, respectively, which straddles the columns 133 and 134, respectively.

Behind the cross beam 130 there is mounted an hydraulic lift 139, having an outer cylinder 140 carried on a footing 141 secured to a base portion 142 of the device. The lift also comprises the usual piston rod 143 the upper end of which is provided with yoke arms 144 and 145 on which is mounted a free-rotating sprocket 146 by means of an axle pin 147.

A sprocket chain 148 overlies the sprocket 146 and one end thereof is secured to the cross beam 130 my means of a bracket 149. The other end is secured by means of a bracket 150 to a fixed structural member 151 of the machine.

The cylinder 140 has the usual hydraulic cables 152 and 153 connected thereto. The lower cable 153 through which fluid is discharged as the piston rod descends is provided with an electrically operated valve 154 of the solenoid or any other suitable type normally biased to its closed position. This valve, in turn, is electrically connected, as shown, in circuit with a source of electrical power and a micro level with switch 155. The switch is pivotally connected to a stationary part of the device, as diagrammatically illustrated in FIG. 8, adjacent the locus of the upper end of the strand bundle 125 being formed, and it is provided with an extension arm 156, the end of which is bifurcated, as at 157, to carry a wheel 158. The wheel normally rests on top of the strand bundle 125 as it is being formed, as shown in FIG. 8. When the top of the bundle 125 reaches a predetermined elevation or level, the switch 155 actuates the valve 154 to its open position against its biasing means and causes the release of fluid from the cylinder 140 through the bottom cable 153. This causes the beam shelf or ledge 113 to be lowered until the switch 155 reaches a position of angularity to open its electrical contact points, hence closing the valve 154 under its biasing action and arresting the further flow of liquid.

Thus the ledge 113 is incrementally lowered as the bundle 125 builds up on the pallet 126.

As indicated above, the outer and inner diameter of the bundle 125 depends upon the amount of the eccentricity E or the distance between the axis of the turntable 110 and drum 14. Thus the dimensions of the bundle can be controlled to a degree by varying (1) the diameter of the drum 14 and (2) changing the eccentricity E or distance between the axes of the drum 14 and turntable 110.

Figure 10:
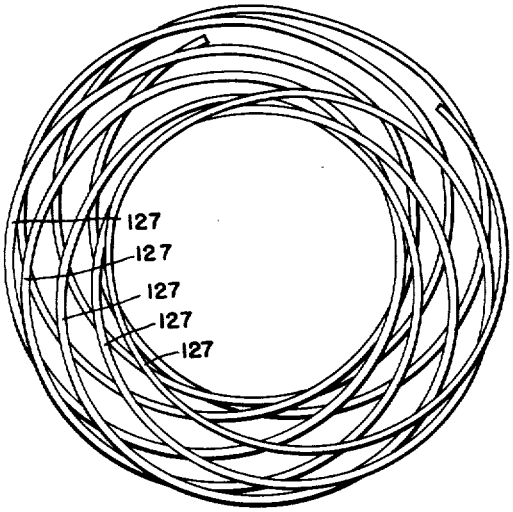
FIG. 10 is a top plan view of a partial circular bundle of wire to illustrate the type of product resulitng from the embodiment of FIGS. 8 and 9.

The actual pattern of formation of the bundle is best shown in FIG. 10. Each loop 127 is disposed from its adjacent loop along the arc or circumference of a circle, rather than in a straight line as in the previous embodiment of FIG. 1 and results in the formation of a helical bundle of continuously overlapping loops. In any particular case the outside diameter of the bundle will be equal to the diameter of the loops plus twice the eccentricity E, while the inside diameter will be equal to the diameter of the loops minus twice the eccentricity. The thickness of the bundle at any point will thus be equal to twice the eccentricity.

Having thus described my invention, I claim:

1. The method of arranging a a bundle of manufactured [strand material] *wire* for transportation and storage comprising forming a series of *self-sustaining* continuous consecutive loops *in a position above a horizontal support and dropping, one by one, the loops of the group* [therefrom and depositing the loops] one above the other *the while displacing the loops relative to each other as they fall* in a helical pattern, each loop being superimposed on and eccentrically displaced relative to its adjacent loops along the circumference of a circle.

2. A portable package comprising a manufactured strip of [elongated material] *wire* in the form of a series of one above the other in a helical pattern, each loop being continuous consecutive loops said loops being arranged superimposed on and eccentrically disposed relative to its adjacent loops along the circumference of a circle.

3. An article of manufacture comprising a strip of [elongated material] *wire* in the form of layers of a series of continuous loops, the loops of each layer being arranged one above the other in a helical pattern, each loop being superimposed on and eccentrically disposed in its corresponding layer relative to its adjacent loops of the layer along the circumference of a circle.

4. An article of manufacture comprising a strip of [elongated material] *wire* in the form of layers of a series of continuous loops, the loops of each layer being arranged one above the other in a helical pattern to form a circular bundle from the center of which each loop is eccentrically displaced, the diameter of the bundle being substantially equal to the diameter of the loops plus twice the eccentricity of the center of the loops relative to the center of the bundle and the inside diameter of the bundle being substantially equal to the diameter of the loops minus twice said eccentricity.

5. *The method of forming without lateral support, a coil of manufactured wire comprising forming in the wire a series of self-sustaining continuous consecutive circular horizontal loops of uniform diameter in a position above a support consisting of a horizontal platform and dropping one by one the loops so formed one over the other onto a circular area of the platform, said area being greater than the area of a loop, the while displacing the loops relative to each other within the area as they fall in a helical pattern, each loop being superimposed on and eccentrically displaced relative to its adjacent loops along the circumference of a circle to form a coil capable of sustaining itself without lateral support.*

6. *The method as defined by claim 5 in which the disposition of the loops on the horizontal platform is effected by rotating the platform about an axis eccentric to the axis of the loops.*

References Cited in the file of this patent or the original patent

UNITED STATES PATENTS

| | | |
|---|---|---|
| 334,453 | Morgan | Jan. 19, 1886 |
| 1,232,014 | Edwards | July 3, 1917 |
| 1,295,139 | Edwards | Feb. 25, 1919 |
| 1,676,606 | Albright | July 10, 1928 |
| 2,216,225 | Bruestle | Oct. 1, 1940 |
| 2,404,742 | Polak et al. | July 23, 1946 |
| 2,407,353 | Wagner | Sept. 10, 1946 |
| 2,736,512 | Drummond et al. | Feb. 28, 1956 |
| 2,738,145 | Taylor | Mar. 13, 1956 |
| 2,742,737 | McElroy | Apr. 24, 1956 |
| 2,849,195 | Richardson et al. | Aug. 26, 1958 |
| 2,959,279 | Krafft et al. | Nov. 8, 1960 |